(12) United States Patent
Watanabe et al.

(10) Patent No.: US 12,231,036 B2
(45) Date of Patent: Feb. 18, 2025

(54) WORK MACHINE

(71) Applicant: HITACHI CONSTRUCTION MACHINERY CO., LTD., Tokyo (JP)

(72) Inventors: Akira Watanabe, Ushiku (JP); Yasunori Ota, Tsuchiura (JP); Yusuke Imai, Arakawa-ku (JP); Manabu Yano, Nagareyama (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 401 days.

(21) Appl. No.: 17/629,674

(22) PCT Filed: Sep. 2, 2020

(86) PCT No.: PCT/JP2020/033332
§ 371 (c)(1),
(2) Date: Jan. 24, 2022

(87) PCT Pub. No.: WO2021/059910
PCT Pub. Date: Apr. 1, 2021

(65) Prior Publication Data
US 2022/0282456 A1    Sep. 8, 2022

(30) Foreign Application Priority Data

Sep. 26, 2019  (JP) ................. 2019-175691

(51) Int. Cl.
*B60L 1/00*    (2006.01)
*B60L 3/00*    (2019.01)
(Continued)

(52) U.S. Cl.
CPC ............ *H02M 1/36* (2013.01); *E02F 9/2004* (2013.01); *E02F 9/2075* (2013.01); *E02F 9/2285* (2013.01); *H02M 3/00* (2013.01)

(58) Field of Classification Search
CPC .. B60L 1/003; B60L 2200/40; B60L 2210/10; B60L 2250/24; B60L 2270/20;
(Continued)

(56) References Cited

U.S. PATENT DOCUMENTS

| | | | |
|---|---|---|---|
| 2012/0016547 A1* | 1/2012 | Aridome | B60L 58/14 |
| | | | 180/65.265 |
| 2013/0058750 A1* | 3/2013 | Hiroki | B60L 7/14 |
| | | | 414/744.2 |

(Continued)

FOREIGN PATENT DOCUMENTS

| | | |
|---|---|---|
| EP | 2 573 281 A1 | 3/2013 |
| JP | 2005-51885 A | 2/2005 |

(Continued)

OTHER PUBLICATIONS

International Preliminary Report on Patentability received in corresponding International Application No. PCT/JP2020/033332 dated Apr. 7, 2022.

(Continued)

*Primary Examiner* — Ian Jen
*Assistant Examiner* — Hossam M Abd El Latif
(74) *Attorney, Agent, or Firm* — MATTINGLY & MALUR, PC

(57) ABSTRACT

A work machine includes: a controller; a first electrical circuit provided with a first power supply that supplies power to the controller; an electric drive source necessary for operating the work machine; and a second electrical circuit provided with a second power supply that supplies power to the electric drive source. The work machine further includes: a capacitor provided to the second electrical circuit; a first precharge device that performs precharge of the capacitor by using power of the first power supply; and a second precharge device that performs precharge of the (Continued)

capacitor by using power of the second power supply. The controller performs precharge by using one of the precharge devices when it is determined that precharge by using the other one of the precharge devices is impossible.

7 Claims, 6 Drawing Sheets

(51) Int. Cl.

| | | |
|---|---|---|
| *B60L 3/04* | (2006.01) | |
| *B60L 50/12* | (2019.01) | |
| *B60L 50/13* | (2019.01) | |
| *B60L 50/61* | (2019.01) | |
| *E02F 3/43* | (2006.01) | |
| *E02F 9/20* | (2006.01) | |
| *E02F 9/22* | (2006.01) | |
| *E02F 9/26* | (2006.01) | |
| *F02D 29/00* | (2006.01) | |
| *F02D 29/02* | (2006.01) | |
| *F02D 29/04* | (2006.01) | |
| *F02D 41/06* | (2006.01) | |
| *H02M 1/00* | (2007.01) | |
| *H02M 1/10* | (2006.01) | |
| *H02M 1/14* | (2006.01) | |
| *H02M 1/32* | (2007.01) | |
| *H02M 1/36* | (2007.01) | |
| *H02M 3/00* | (2006.01) | |
| *H02P 25/028* | (2016.01) | |
| *H02P 27/06* | (2006.01) | |
| *H02P 29/024* | (2016.01) | |
| *H02P 29/032* | (2016.01) | |

(58) Field of Classification Search
CPC ...... B60L 23/0046; B60L 3/0092; B60L 3/04; B60L 50/12; B60L 50/13; B60L 50/61; E02F 9/2004; E02F 9/2075; E02F 9/2285; E02F 3/435; E02F 9/2091; E02F 9/268; F02D 29/00; F02D 29/04; F02D 41/062; F02D 29/02; H02M 1/36; H02M 3/00; H02M 1/008; H02M 1/10; H02M 1/32; H02M 1/0038; H02M 1/14; H02P 25/028; H02P 27/06; H02P 29/024; H02P 29/0241; H02P 29/027; H02P 2207/05; H02P 29/032

USPC .......................................................... 701/50

See application file for complete search history.

(56) References Cited

U.S. PATENT DOCUMENTS

| | | | |
|---|---|---|---|
| 2014/0132226 A1 | 5/2014 | Sakamoto et al. | |
| 2015/0035539 A1 | 2/2015 | Wakida et al. | |
| 2017/0268201 A1* | 9/2017 | Joung | E02F 9/2004 |
| 2019/0135119 A1 | 5/2019 | Nozawa | |
| 2019/0176631 A1* | 6/2019 | Senba | H05K 7/20872 |
| 2019/0181633 A1* | 6/2019 | Nozawa | H02P 29/68 |
| 2020/0376971 A1* | 12/2020 | Takemoto | H02J 7/342 |

FOREIGN PATENT DOCUMENTS

| | | |
|---|---|---|
| JP | 2008-214970 A | 9/2008 |
| JP | 2009-189209 A | 8/2009 |
| JP | 2010-124536 A | 6/2010 |
| JP | 2014-198969 A | 10/2014 |
| JP | 2015-033233 A | 2/2015 |
| JP | 2017-093057 A | 5/2017 |
| JP | 2019-088142 A | 6/2019 |
| WO | 2012/172685 A1 | 12/2012 |

OTHER PUBLICATIONS

Chinese Office Action received in corresponding Chinese Application No. 202080052408.7 dated Sep. 28, 2023.
International Search Report of PCT/JP2020/033332 dated Nov. 17, 2020.
Extended European Search Report received in corresponding European Application No. 20868052.0 dated May 10, 2023.

* cited by examiner

WORK MACHINE

TECHNICAL FIELD

The present invention relates to a work machine.

BACKGROUND ART

In recent years, electrification of work machines such as hydraulic excavators has been underway for the purposes of caring for the environment, enhancing the fuel efficiency, and so on. For example, equipment such as a pump that is driven by the motive power of an engine keeps operating, and consumes energy as long as the engine is activated no matter what the use state of a user is. In contrast to this, by driving equipment such as a pump by using an electric drive source such as an electric motor, it becomes possible to activate the electric drive source only to a necessary extent only when it is necessary to activate the electric drive source, and it becomes possible to reduce the fuel consumption amount.

Patent Document 1 discloses an electrically driven work machine in which a pilot pump is driven by an electric motor, and the output power of the electric motor is changed according to the operation amounts of operation levers.

PRIOR ART DOCUMENT

Patent Document

Patent Document 1: JP-2008-214970-A

SUMMARY OF THE INVENTION

Problem to be Solved by the Invention

In such a work machine, when an ignition switch is turned on, the engine is started after equipment such as a controller of an electric drive source provided to the work machine is started. When the equipment such as the controller of the electric drive source is started, a capacitor provided to an electrical circuit is precharged in order to prevent the electrical circuit from being damaged due to an inrush current flowing to the capacitor provided to the electrical circuit. However, where precharge cannot be performed for some cause, it becomes impossible to start each piece of equipment, and there is a risk of being unable to operate the work machine.

An object of the present invention is to reduce situations where a work machine cannot be operated.

Means for Solving the Problem

A work machine according to one aspect of the present invention includes: a controller that controls the work machine; a first power supply that supplies power to the controller; a first electrical circuit provided with the first power supply; an electric drive source necessary for operating the work machine; a second power supply that supplies power to the electric drive source; and a second electrical circuit provided with the second power supply. The work machine further includes: a capacitor provided to the second electrical circuit; a first precharge device that performs precharge of the capacitor by using power from the first power supply; and a second precharge device that performs precharge of the capacitor by using power from the second power supply. The controller is configured to: determine whether or not precharge of the capacitor by using one of the first precharge device and the second precharge device is possible; and perform precharge of the capacitor by using another one of the first precharge device and the second precharge device when it is determined that precharge of the capacitor by using the one of the first precharge device and the second precharge device is impossible.

Advantage of the Invention

According to the present invention, it is possible to reduce situations where a work machine cannot be operated.

MODES FOR CARRYING OUT THE INVENTION

Hereinafter, an embodiment of the present invention is explained with reference to the figures. Note that a work machine in examples explained in the present embodiment is a hybrid hydraulic excavator.

Figure 1:
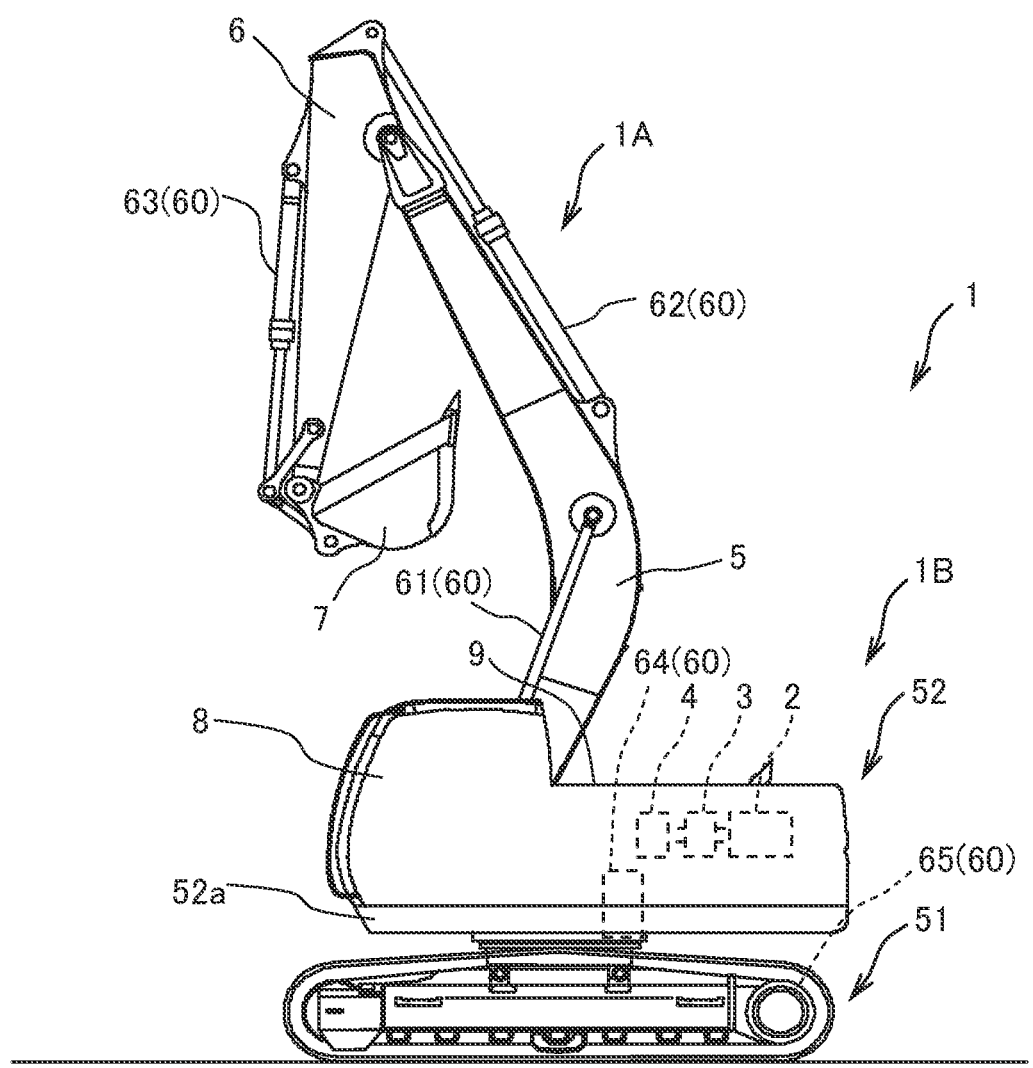
FIG. 1 is a side view schematically illustrating the external appearance of a hybrid hydraulic excavator which is an example of a work machine according to the present embodiment.

FIG. 1 is a side view schematically illustrating the external appearance of a hybrid hydraulic excavator. As illustrated in FIG. 1, a hybrid hydraulic excavator (hereinafter, denoted as a hydraulic excavator) 1 includes an articulated front work implement (hereinafter, denoted simply as a work implement) 1A and a machine body 1B. The machine body 1B has: a lower travel structure 51 that is caused to travel by a pair of left and right crawlers being driven by a pair of left and right travel hydraulic motors 65; and an upper swing structure 52 that is provided on the lower travel structure 51 and is swung relative to the lower travel structure 51 by a swing hydraulic motor 64.

The work implement 1A includes a plurality of front implement members (a boom 5, an arm 6, and a bucket 7) which are coupled with each other in series. A base end portion of the boom 5 is pivotably supported at a front portion of the upper swing structure 52. A tip portion of the boom 5 is pivotably coupled with the arm 6, and a tip portion of the arm 6 is pivotably coupled with the bucket 7 as a work device. The boom 5 is driven by a hydraulic cylinder 61, the arm 6 is driven by a hydraulic cylinder 62, and the bucket 7 is driven by a hydraulic cylinder 63. Hereinafter, the hydraulic cylinders 61, 62, and 63, the swing hydraulic motor 64, and the travel hydraulic motors 65 are also collectively denoted as hydraulic actuators 60. These hydraulic actuators 60 are actuators driven by a hydraulic working fluid as a working fluid delivered from a main pump 4 mentioned later.

One side (e.g. the left side when viewed from behind) of a front portion on a swing frame 52a included in the upper swing structure 52 is provided with a cab 8. The cab 8 is provided with an operator's seat where an operator sits on, and operation devices 45 (see FIG. 2) operated by the operator. A prime mover chamber 9 that houses a drive system having an engine 2 which is a prime mover, a generator motor 3, a main pump 4, and the like is provided behind the cab 8 on the swing frame 52a.

Figure 2:
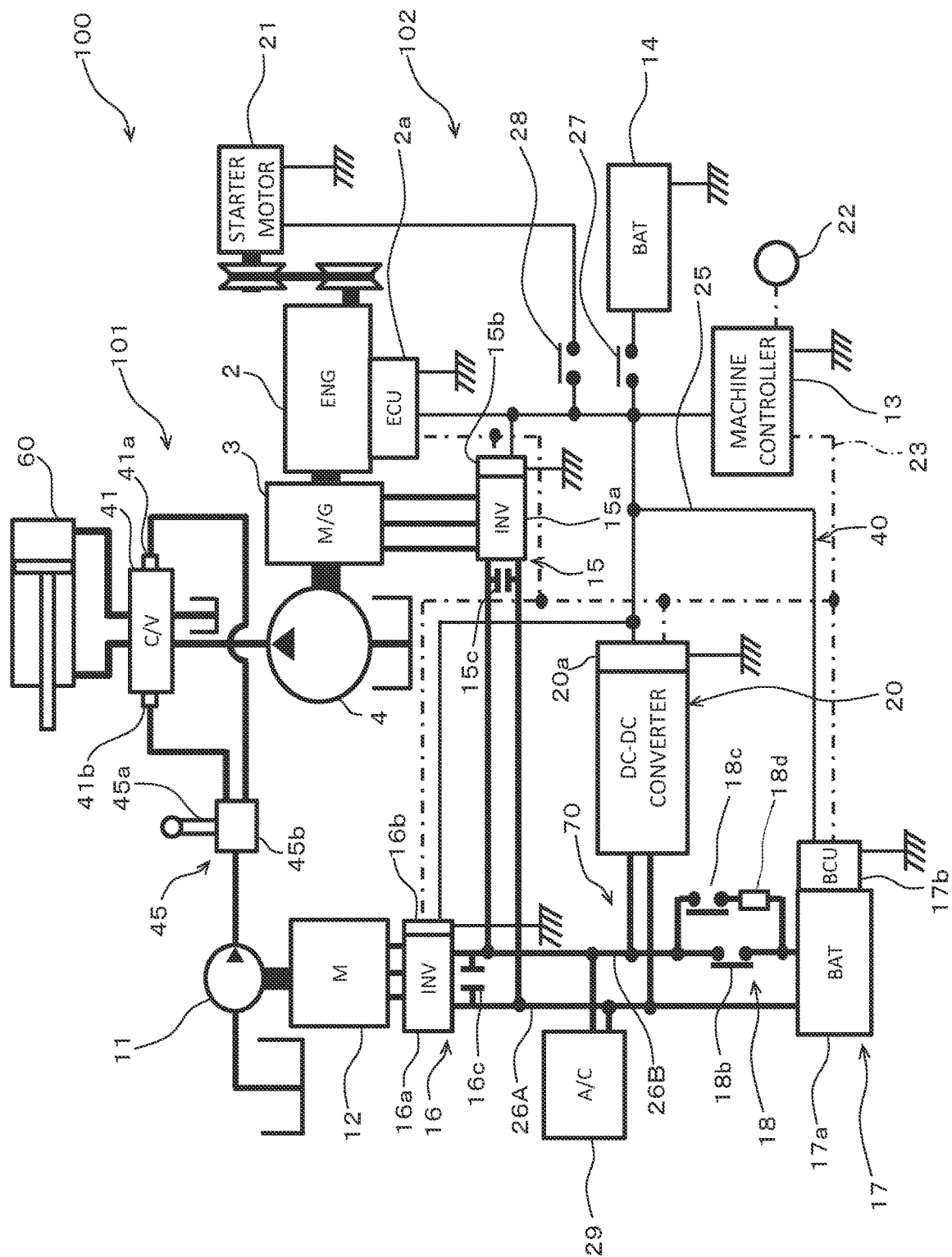
FIG. 2 is a figure illustrating a drive system of the hydraulic excavator according to the present embodiment.

With reference to FIG. 2, a drive system 100 of the hydraulic excavator 1 according to the present embodiment is explained. FIG. 2 is a figure illustrating the drive system 100 of the hydraulic excavator 1 according to the present embodiment. The drive system 100 includes: a hydraulic system 101 that controls operation of the hydraulic actuators 60; an electrical drive system 102 that drives hydraulic pumps (the main pump 4 and a pilot pump 11) of the hydraulic system 101; the engine 2 mechanically connected to the main pump 4 and the generator motor 3; and a starter motor 21 mechanically connected to the engine 2.

The engine 2 is provided with an engine controller 2a that monitors the state of the engine 2 and controls operation of the engine 2. The engine controller 2a controls the output torque, rotation speed (engine rotation speed), and the like of the engine 2 on the basis of commands from a machine controller 13.

The hydraulic system 101 includes: the main pump 4 mechanically connected to the engine 2 and the generator motor 3; control valves 41 that control flows of the hydraulic working fluid supplied from the main pump 4 to the hydraulic actuators 60; the pilot pump 11 that is mechanically connected to an electric motor 12 and is driven by the electric motor 12; and the operation devices 45 that are connected to the pilot pump 11 and generate pilot pressures which are operation signals for operating the control valves 41 by using a delivery pressure of the pilot pump 11 as a source pressure. Note that, in FIG. 2, the hydraulic cylinder 61 is representatively illustrated as an example of the hydraulic actuators 60, and illustrations of other hydraulic actuators (the hydraulic cylinders 62 and 63, the swing hydraulic motor 64, and the travel hydraulic motors 65) are omitted. That is, although not illustrated, a control valve 41 and an operation device 45 are provided corresponding to each of a plurality of the hydraulic actuators 60.

The operation devices 45 according to the present embodiment are hydraulic pilot type operation lever devices having levers 45a that can be inclined. Each operation device 45 includes a pressure reducing valve 45b having a mechanism that reduces a pilot pressure (source pressure) output from the pilot pump 11 when the lever 45a is operated. The pilot pump 11 sucks in, and delivers the hydraulic working fluid retained in a tank. Note that although not illustrated, a pilot line connecting the pilot pump 11 to the pressure reducing valve 45b of the operation device 45 is provided with a pilot relief valve, and this pilot relief valve determines the maximum pressure of the pilot pressure.

The pressure reducing valve 45b generates, by using the delivery pressure of the pilot pump 11, as a source pressure, the pilot pressure (also referred to as an operating pressure in some cases) according to the operation amount and operation direction of the lever 45a operated by an operator. The operating pressure generated in the pressure reducing valve 45b is introduced to pressure receiving chambers 41a and 41b of the control valve 41, and is used as a control signal for driving the control valve 41.

The hydraulic working fluid delivered from the main pump 4 is introduced to the hydraulic actuators 60 through the control valves 41 to thereby drive the hydraulic actuators 60. For example, when the lever 45a of an operation device 45 for operating the boom 5 is operated to incline in a first direction, an operating pressure according to the operation amount of the lever 45a is generated in the pressure reducing valve 45b, and acts on the first pressure receiving chamber 41a of the control valve 41. Thereby, the hydraulic working fluid delivered from the main pump 4 is supplied to the rod chamber of the hydraulic cylinder 61, also the hydraulic working fluid is discharged from the bottom chamber to the tank, and the hydraulic cylinder 61 shrinks. Due to the shrinkage of the hydraulic cylinder 61, the boom 5 is pivoted so as to fall. In addition, when the lever 45a of the operation device 45 for operating the boom 5 is operated to incline in a second direction which is opposite to the first direction, an operating pressure according to the operation amount of the lever 45a is generated in the pressure reducing valve 45b, and acts on the second pressure receiving chamber 41b of the control valve 41. Thereby, the hydraulic working fluid delivered from the main pump 4 is supplied to the bottom chamber of the hydraulic cylinder 61, also the hydraulic working fluid is discharged from the rod chamber to the tank, and the hydraulic cylinder 61 is expanded. Due to the expansion of the hydraulic cylinder 61, the boom 5 is pivoted so as to rise.

The electrical drive system 102 includes: the generator motor 3 mechanically connected to the main pump 4 and the engine 2; the machine controller 13 as a controller that monitors the state of each section of the hydraulic excavator 1 and controls operation of each section of the hydraulic excavator 1; a low voltage power supply 14 as a first power supply that supplies power to the machine controller 13; a low voltage circuit 40 as a first electrical circuit provided with the low voltage power supply 14; the electric motor 12 which is an electric drive source necessary for operating the hydraulic excavator 1; a high voltage power supply 17 as a second power supply that supplies power to the electric motor 12; a high voltage circuit 70 as a second electrical circuit provided with the high voltage power supply 17; a DC-DC converter 20 provided between the low voltage circuit 40 and the high voltage circuit 70; and an electrical driving compressor 29 which is an auxiliary machine connected to the high voltage circuit 70.

The DC-DC converter 20 is a bidirectional DC-DC converter, and includes: a high voltage side switching circuit connected to the high voltage circuit 70; a driving circuit that controls a switching element of the high voltage side switching circuit; a low voltage side switching circuit connected to the low voltage circuit 40; a driving circuit that controls a switching element of the low voltage side switching circuit; a transformer provided between the high voltage side switching circuit and the low voltage side switching circuit; and a converter controller 20a that controls opening/closing operation of the switching elements by using the driving circuits.

The converter controller 20a of the DC-DC converter 20 sets the control mode to one of a boost mode, a step down mode, a stop mode, and a precharge mode on the basis of a signal from the machine controller 13.

The DC-DC converter 20 boosts, when the control mode has been set to the boost mode, power of the low voltage circuit 40 and supplies the power to the high voltage circuit 70, by the converter controller 20a controlling opening/ closing operation of the switching elements. The DC-DC converter 20 steps down, when the control mode has been set to the step down mode, power of the high voltage circuit 70 and supplies the power to the low voltage circuit 40, by the converter controller 20a controlling opening/closing operation of the switching elements. The DC-DC converter 20 executes, when the control mode has been set to the stop mode, neither boosting nor step down.

The DC-DC converter 20 has a current control functionality, and uses the functionality to perform precharge of smoothing capacitors 15c and 16c provided to the high voltage circuit 70 mentioned later. That is, the DC-DC converter 20 functions as a first precharge device that performs precharge of the smoothing capacitors 15c and 16c by using power from the low voltage power supply 14. The DC-DC converter 20 boosts, when the control mode has been set to the precharge mode, power of the low voltage circuit 40 and supplies the power to the high voltage circuit 70, by the converter controller 20a controlling opening/closing operation of the switching elements. Note that in the precharge mode, a current output from the DC-DC converter 20 to the high voltage circuit 70 is controlled such that the output current becomes a current smaller than an output current at the time of the boost mode. For example, when the control mode is set to the precharge mode, the converter controller 20a sets a current output to the high voltage circuit 70 to several A (amperes) (e.g. sets the output current to a current equal to or smaller than 5 to 10 A (amperes)), and increases the voltage of the high voltage circuit 70 gradually from 0 V (volts) to a rated voltage.

The generator motor 3 is mechanically connected between the engine 2 and the main pump 4. The generator motor 3 is, for example, a permanent magnet type synchronous motor, performs power generation by being rotation driven by the engine 2, and supplies the generated power to the high voltage circuit 70. In addition, the generator motor 3 assists, by being supplied with power from the high voltage circuit 70, driving of the engine 2. That is, the generator motor 3 has a functionality of performing power generation by being rotation driven by the engine 2 (a generator functionality), and a functionality of assisting driving of the engine 2 by using supplied power (a motor functionality).

The generator motor 3 functions as a motor when an assistance condition is satisfied, and functions as a generator when the assistance condition is not satisfied. For example, the assistance condition is satisfied when the battery level of the high voltage power supply 17 is higher than a predetermined value, and when the operation amounts of the levers 45a of the operation devices 45 are larger than a predetermined value. In addition, the assistance condition is not satisfied when the battery level of the high voltage power supply 17 is lower than the predetermined value or when the operation amounts of the levers 45a of the operation devices 45 are smaller than the predetermined value. Note that the assistance condition is not limited to this.

The operation amount of an operation device 45 is sensed by an operation sensor 45s (see FIG. 3), and a signal representing results of the sensing is output to the machine controller 13. As the operation sensor 45s, a pressure sensor that senses an operating pressure, an angle sensor that senses the inclination angle of the lever 45a, or the like can be adopted.

The electric motor 12 is, for example, a permanent magnet type synchronous motor, is mechanically connected to the pilot pump 11, and drives the pilot pump 11 by being supplied with power. The rotation speed of the electric motor 12 is controlled on the basis of the operation amounts of the levers 45a of the operation devices 45. When the operation amounts of the levers 45a of all the operation devices 45 are 0 (zero), the electric motor 12 gets to a stopped condition. In addition, the electric motor 12 is controlled such that the rotation speed of the electric motor 12 increases according to an increase in the operation amounts of the levers 45a of the operation devices 45. At the time of combined operation where the levers 45a of a plurality of operation devices 45 are operated, the rotation speed is controlled with all the operation amounts taken into consideration. Since the rotation speed of the electric motor 12 is controlled according to the operation amounts of the levers 45a of the operation devices 45 in this manner, the fuel efficiency can be enhanced. Note that since a pilot pressure cannot be generated by the pilot pump 11 when the electric motor 12 cannot to be driven, it becomes impossible to operate the hydraulic excavator 1 even if the operation devices 45 are operated. Because of this, the electric motor 12 can be said to be an electric drive source necessary for operating the hydraulic excavator 1.

The high voltage circuit 70 connected with the high voltage power supply 17 has: a first inverter 15 for the generator motor 3; a second inverter 16 for the electric motor 12; and high voltage power lines 26A and 26B connected to the first inverter 15, the second inverter 16, and the high voltage power supply 17.

The high voltage power supply 17 is electrically connected to the generator motor 3 via the first inverter 15, and electrically connected to the electric motor 12 via the second inverter 16. The high voltage power supply 17 includes a power storage device 17a that is capable of storing power, and a battery controller 17b for monitoring the state of the power storage device 17a and controlling the power storage device 17a. The power storage device 17a is, for example, a power storage device including a plurality of lithium ion secondary batteries as electric power storage elements, and the rated voltage is 48 V (volts). The power storage device 17a of the high voltage power supply 17 is charged with power (stores power) by being supplied with generated power generated by the generator motor 3. In addition, the power storage device 17a of the high voltage power supply 17 discharges (supplies) the power with which the power storage device 17a is charged, to the generator motor 3 and the electric motor 12.

The battery controller 17b controls the charging operation and discharging operation of the high voltage power supply 17 on the basis of a command from the machine controller 13. In addition, the battery controller 17b monitors state information such as the current value I, voltage value V, or temperature T of the high voltage power supply 17 by using sensors, and outputs the state information to the machine controller 13.

The first inverter 15 is electrically connected to the generator motor 3, and controls driving of the generator motor 3. The first inverter 15 has: a first inverter circuit 15a having a plurality of switching elements (e.g. six switching elements) including transistors, insulated gate bipolar transistors (IGBT), and the like; a generator motor controller 15b that controls opening/closing operation of the switching elements; and a first smoothing capacitor 15c provided between the direct current side high voltage power lines 26A and 26B of the inverter circuit 15a, for example. The first smoothing capacitor 15c smooths the voltage between the pair of the high voltage power lines 26A and 26B.

The first inverter 15 converts, by the generator motor controller 15b controlling opening/closing operation of the switching elements of the first inverter circuit 15a, power generated by the generator motor 3 into direct current power and supplies the generated power to the high voltage power lines 26A and 26B, at the time of power generation of the generator motor 3. On the other hand, the first inverter 15 converts, by the generator motor controller 15b controlling opening/closing operation of the switching elements of the first inverter circuit 15a, direct current power supplied from the high voltage power supply 17 to the high voltage power lines 26A and 26B into three phase alternating current power, supplies the three phase alternating current power to the generator motor 3, and rotation drives the generator motor 3, at the time of motor driving of the generator motor 3.

The second inverter 16 is electrically connected to the electric motor 12, and controls driving of the electric motor 12. The second inverter 16 has: a second inverter circuit 16a having a plurality of switching elements (e.g. six switching elements) including transistors, insulated gate bipolar transistors (IGBT), and the like; a motor controller 16b that controls opening/closing operation of the switching elements; and a second smoothing capacitor 16c provided between the direct current side high voltage power lines 26A and 26B of the inverter circuit 16a, for example. The second smoothing capacitor 16c provided to the high voltage circuit 70 smooths the voltage between the pair of the high voltage power lines 26A and 26B.

The second inverter 16 converts, by the motor controller 16b controlling opening/closing operation of the switching elements of the second inverter circuit 16a, direct current power supplied from the high voltage power supply 17 to the high voltage power lines 26A and 26B into three phase alternating current power, supplies the three phase alternating current power to the electric motor 12, and rotation drives the electric motor 12.

The first and second smoothing capacitors 15c and 16c are, for example, electrolytic capacitors or film capacitors, and suppresses ripples of voltage/current that are caused by high speed switching (ON/OFF) operation of the switching elements.

In addition, the high voltage circuit 70 is provided with a relay circuit 18. As illustrated, the relay circuit 18 is provided on the side closer to the high voltage power supply 17 relative to the smoothing capacitors 15c and 16c on the high voltage power lines 26A and 26B.

The relay circuit 18 has: a main relay 18b provided to the high voltage power line 26B; and a precharge relay 18c and a precharge resistor 18d that are connected in parallel with the main relay 18b. The main relay 18b is a relay that is capable of disconnecting the high voltage power supply 17 from the high voltage circuit 70. Note that whereas the example of the main relay 18b being provided on the high voltage power line 26B is explained in the present embodiment, main relays may be provided on both the pair of the high voltage power lines 26A and 26B. The precharge relay 18c and the precharge resistor 18d are connected in series. The relay circuit 18 functions as a second precharge device that performs precharge of the smoothing capacitors 15c and 16c by using power from the high voltage power supply 17. The precharge resistor 18d is a resistor for reducing an inrush current to the smoothing capacitors 15c and 16c.

By making the precharge relay 18c conductive, performing precharge of the smoothing capacitors 15c and 16c, and then making the main relay 18b conductive, it is possible to prevent an inrush current from flowing to the main relay 18b and equipment connected to the high voltage circuit 70. As a result, it is possible to prevent welding of the main relay 18b, and damage to the equipment connected to the high voltage circuit 70.

The electrical driving compressor 29 is a compressor of an air conditioner that cools air in the cab 8 of the hydraulic excavator 1, and is an auxiliary machine that is driven by power supplied via the high voltage circuit 70.

The low voltage circuit 40 connected with the low voltage power supply 14 has: a low voltage power line 25 that connects the low voltage power supply 14 to each controller 13, 2a, 17b, 20a, 15b, and 16b; a battery relay 27; and a starter relay 28. Note that the low voltage power line 25 is also connected with the starter motor 21.

The low voltage power supply 14 is a power storage device that is capable of storing power, and is, for example, a lead storage battery having a rated voltage of 24 V (volts). The low voltage power supply 14 discharges (supplies) the power with which the low voltage power supply 14 is charged, to the machine controller 13, the engine controller 2a, the battery controller 17b, the starter motor 21, the converter controller 20a, the generator motor controller 15b, and the motor controller 16b.

The battery relay 27 is a relay that is capable of disconnecting the low voltage power supply 14 from the low voltage circuit 40, and the starter relay 28 is a relay that is capable of disconnecting the starter motor 21 from the low voltage circuit 40. The battery relay 27 becomes conductive when an ignition switch 22 mentioned later is switched to the ON position, and interrupts the connection when the ignition switch 22 is switched to the OFF position. The starter relay 28 is turned on (becomes conductive) when the starter relay 28 receives an ON (conduction) signal from the machine controller 13 as input, and is turned off (interrupts the connection) when the starter relay 28 receives an OFF (interruption) signal from the machine controller 13 as input. Note that the starter relay 28 is a normally open relay that is normally interrupting the connection, and becomes conductive when the starter relay 28 is supplied with a control current (ON signal) from the machine controller 13.

The machine controller 13 is connected with the ignition switch 22, and the operation position of the ignition switch 22 is sensed by the machine controller 13. The ignition switch 22 is a switch operated by an operator, and is, for example, a key switch that can be switched to the OFF position, the ON position, and the start position. Note that the ignition switch 22 is not limited to a key switch, but may be a push type switch that can output an OFF signal, an ON signal, and a start signal to the machine controller 13.

When the ignition switch 22 is switched from the OFF position to the ON position, the battery relay 27 becomes conductive, power is supplied from the low voltage power supply 14 to equipment such as the machine controller 13, the engine controller 2a, or the battery controller 17b, and the equipment is activated.

The starter motor 21 is, for example, a permanent magnet type motor. When the ignition switch 22 having been switched to the ON position is further switched to the start position, the machine controller 13 outputs an ON (conduction) signal to the starter relay 28. Thereby, the starter relay 28 becomes conductive, power is supplied from the low voltage power supply 14 to the starter motor 21, and the starter motor 21 is driven. Accordingly, when the ignition switch 22 is switched to the start position, the output shaft of the engine 2 starts being driven by the starter motor 21. The ignition switch 22 performs momentary operation at the start position, and when an operator stops switching to the start position, the ignition switch 22 returns to the ON position automatically.

The machine controller 13, the engine controller 2a, the battery controller 17b, the converter controller 20a, the generator motor controller 15b, and the motor controller 16b are connected to each other by a machine body communication network 23 such as a CAN, and can exchange information with each other.

Each controller 13, 2a, 17b, 20a, 15b, and 16b includes a microcomputer including a CPU (Central Processing Unit) as an operation circuit, a ROM (Read Only Memory) and a RAM (Random Access Memory) as storage devices, an input/output interface (I/O interface), and other peripheral circuits. Each controller 13, 2a, 17b, 20a, 15b, and 16b can also include a plurality of microcomputers.

Figure 3:
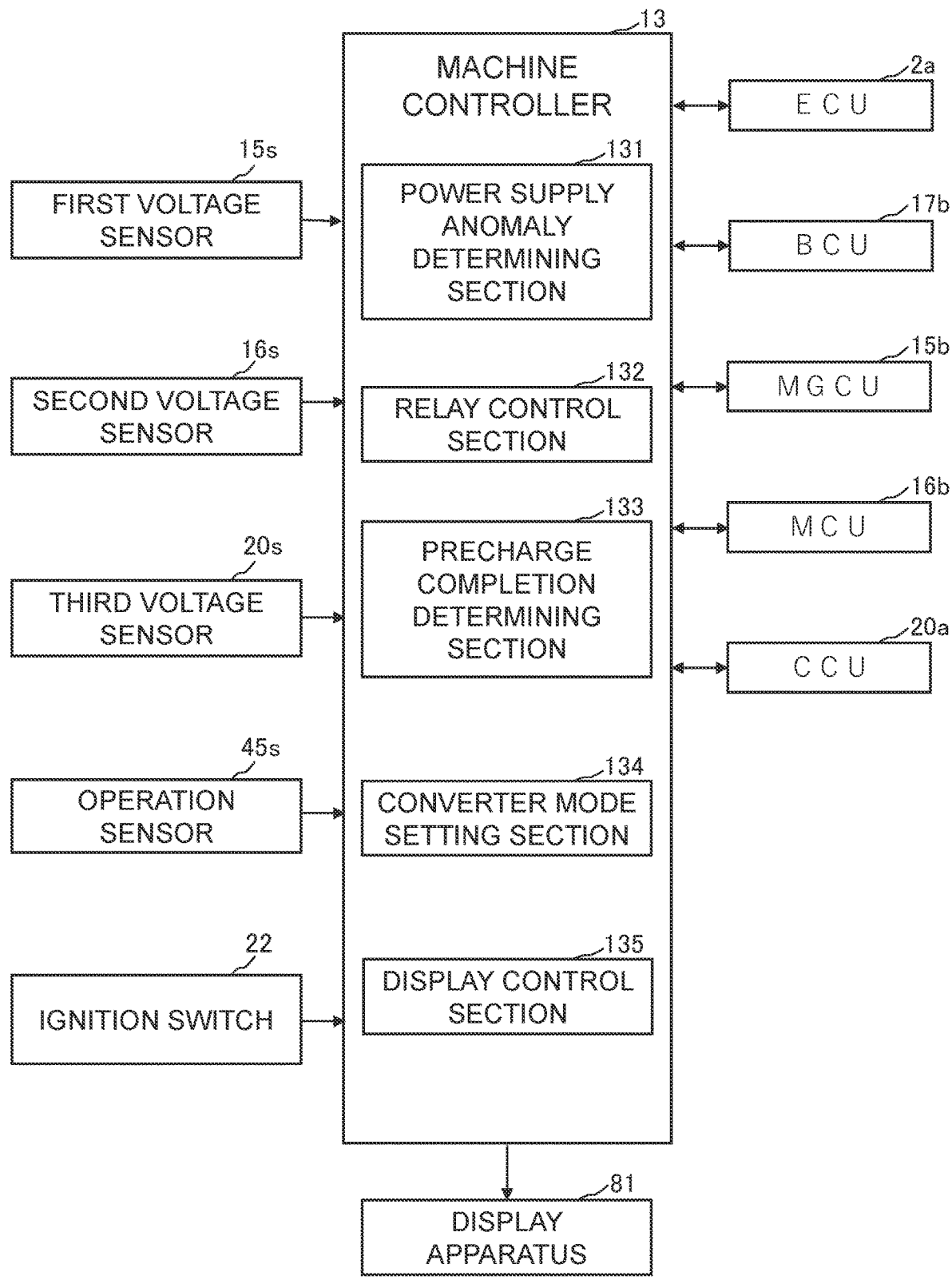
FIG. 3 is a functional block diagram of a machine controller.

FIG. 3 is a functional block diagram of the machine controller 13. By executing a program stored on a storage device, the machine controller 13 functions as a power supply anomaly determining section 131, a relay control section 132, a precharge completion determining section 133, a converter mode setting section 134, and a display control section 135.

The machine controller 13 is set so as to perform precharge of the smoothing capacitors 15c and 16c by using one (the relay circuit 18 in the present embodiment) of the DC-DC converter 20 as the first precharge device, and the relay circuit 18 as the second precharge device. However, where there is an anomaly of the high voltage power supply 17 or an anomaly in the relay circuit 18, the smoothing capacitors 15c and 16c are precharged by using the DC-DC converter 20. In order to realize this, the machine controller 13 determines whether or not precharge of the smoothing capacitors 15c and 16c by using the relay circuit 18 is possible, and, on the basis of results of the determination, performs precharge of the smoothing capacitors 15c and 16c by using either the DC-DC converter 20 or the relay circuit 18. Hereinafter, details are explained.

The power supply anomaly determining section 131 determines, on the basis of a signal output from the battery controller 17b, whether or not the high voltage power supply 17 is anomalous. An anomaly of the high voltage power supply 17 means a state where the high voltage power supply 17 cannot discharge power sufficiently. The determination as to whether or not the high voltage power supply 17 is anomalous can be made on the basis of information representing the state of the high voltage power supply 17 such as the current value I, voltage value V, or temperature T included in a signal output from the battery controller 17b.

The power supply anomaly determining section 131 determines that the electric current state of the high voltage power supply 17 is normal in a case where the current value I of the high voltage power supply 17 sensed by an electric current sensor of the battery controller 17b is smaller than a threshold 10 when an internal switch of the high voltage power supply 17 is closed, and determines that the electric current state of the high voltage power supply 17 is anomalous in a case where the current value I is equal to or larger than the threshold 10, for example. The threshold 10 is a threshold for determining whether or not the current value I is in a state of an overcurrent, and the threshold 10 is stored on a storage device of the machine controller 13 in advance.

The power supply anomaly determining section 131 makes anomaly determinations about the state (an overcurrent determination, an overvoltage determination, an overtemperature, etc.) on the basis of each piece of state information, and, when it is determined that results of all the determinations are normal, determines that the high voltage power supply 17 is normal, that is, the high voltage power supply 17 is not anomalous, and turns off a power supply anomaly flag. On the other hand, when it is determined that even one of the results of the determinations is anomalous, the power supply anomaly determining section 131 determines that the high voltage power supply 17 is anomalous, and turns on the power supply anomaly flag. Note that the power supply anomaly determining section 131 determines, also when a signal from the battery controller 17b is stopped, that the high voltage power supply 17 is anomalous, and turns on the power supply anomaly flag.

When the high voltage power supply 17 is anomalous, it is impossible to perform precharge of the smoothing capacitors 15c and 16c by using the relay circuit 18. On the other hand, when the high voltage power supply 17 is not anomalous, as mentioned later, it is possible to perform precharge of the smoothing capacitors 15c and 16c by using the relay circuit 18 if there are no anomalies in the relay circuit 18. Accordingly, the power supply anomaly determining section 131 functions as a first determining section that determines whether or not precharge of the smoothing capacitors 15c and 16c by using the relay circuit 18 is possible.

The relay control section 132 outputs, when the power supply anomaly determining section 131 determines that the high voltage power supply 17 is anomalous, an OFF (interruption) signal to the main relay 18b and precharge relay 18c of the relay circuit 18. The relay control section 132 outputs, when the power supply anomaly determining section 131 determines that the high voltage power supply 17 is not anomalous, an OFF (interruption) signal to the main relay 18b of the relay circuit 18, and outputs an ON (conduction) signal to the precharge relay 18c of the relay circuit 18. Note that, in the present embodiment, the main relay 18b and the precharge relay 18c are normally open relays that are normally interrupting the connection, and become conductive when the main relay 18b and the precharge relay 18c are supplied with a control current (ON signal) from the machine controller 13.

The converter mode setting section 134 outputs a signal for setting the control mode to the precharge mode to the converter controller 20a of the DC-DC converter 20 when the power supply anomaly determining section 131 determines that the high voltage power supply 17 is anomalous, that is, when the power supply anomaly determining section 131 determines that it is impossible to perform precharge of the smoothing capacitors 15c and 16c by using the relay circuit 18. The converter controller 20a of the DC-DC converter 20 sets the control mode to the precharge mode when having received, as input, the signal for setting the control mode to the precharge mode from the machine controller 13.

Here, even when there are no anomalies in the high voltage power supply 17, it is impossible to normally complete precharge of the smoothing capacitors 15c and 16c in a case where a signal line that outputs an ON (conduction) signal from the machine controller 13 to the precharge relay 18c is disconnected, or there is an anomaly in the precharge relay 18c such as a malfunction of the precharge relay 18c. In view of this, in the present embodiment, the precharge completion determining section 133 determines whether or not precharge of the smoothing capacitors 15c and 16c has been completed normally.

Specifically, the precharge completion determining section 133 measures time that has elapsed since an ON (conduction) signal is output to the precharge relay 18c, that is, time that has elapsed since the start of precharge of the smoothing capacitors 15c and 16c by using the relay circuit 18, and determines whether or not precharge has been completed when the measured time t has become longer than predetermined time t0. The determination about the completion of precharge is made on the basis of whether or not a voltage Vc of the high voltage circuit 70 is equal to or higher than a predetermined voltage Vc0. The predetermined time t0 is set on the basis of time required for the completion of precharge of the smoothing capacitors 15c and 16c since the precharge is started, and is stored on a storage device in advance. The time required for the completion of precharge of the smoothing capacitors 15c and 16c since the start can be obtained through experiments and the like. The predetermined voltage Vc0 is set on the basis of the rated voltage of the high voltage power supply 17, and stored on a storage device in advance.

The precharge completion determining section 133 determines, when the measured time t has become longer than the predetermined time t0, that precharge has not been completed normally, that is, it is impossible to perform precharge of the smoothing capacitors 15c and 16c by using the relay circuit 18, in a case where the voltage Vc of the high voltage circuit 70 is lower than the predetermined voltage Vc0. The precharge completion determining section 133 determines, when the measured time t has become longer than the predetermined time t0, that precharge of the smoothing capacitors 15c and 16c has been completed normally in a case where the voltage Vc of the high voltage circuit 70 is equal to or higher than the predetermined voltage Vc0.

That precharge of the smoothing capacitors 15c and 16c has been completed normally suggests that there are no anomalies in the precharge relay 18c. In addition, that precharge of the smoothing capacitors 15c and 16c has not been completed normally suggests that there is an anomaly in the precharge relay 18c. Accordingly, the precharge completion determining section 133 functions as a relay anomaly determining section that determines whether or not there is an anomaly in the precharge relay 18c.

In addition, when the precharge relay 18c is anomalous, it is impossible to perform precharge of the smoothing capacitors 15c and 16c by using the relay circuit 18. On the other hand, when the precharge relay 18c is not anomalous, it is possible to perform precharge of the smoothing capacitors 15c and 16c by using the relay circuit 18 if there are no anomalies in the high voltage power supply 17. Accordingly, the precharge completion determining section 133 functions as a second determining section that determines whether or not precharge of the smoothing capacitors 15c and 16c by using the relay circuit 18 is possible.

In the present embodiment, the machine controller 13 is connected with: a first voltage sensor 15s that senses a direct current side terminal voltage Vc1 of the first inverter 15; a second voltage sensor 16s that senses a direct current side terminal voltage Vc2 of the second inverter 16; and a third voltage sensor 20s that senses a high voltage circuit 70 side terminal voltage Vc3 of the DC-DC converter 20, and signals representing sensing results of the voltage sensors 15s, 16s, and 20s are input to the machine controller 13.

The precharge completion determining section 133 determines, on the basis of the voltages sensed by the voltage sensors 15s, 16s, and 20s, whether or not precharge has been completed normally. The precharge completion determining section 133 determines, on the basis of the signals from the voltage sensors 15s, 16s, and 20s, that precharge of the smoothing capacitors 15c and 16c has been completed normally and turns off a relay anomaly flag in a case where each of the voltage values Vc1, Vc2, and Vc3 is equal to or higher than the predetermined voltage Vc0 when the measured time t has become longer than the predetermined time t0. On the other hand, the precharge completion determining section 133 determines, on the basis of the signals from the voltage sensors 15s, 16s and, 20s, that precharge of the smoothing capacitors 15c and 16c has not been completed normally and turns on the relay anomaly flag in a case where at least one of the voltage values Vc1, Vc2, and Vc3 is lower than the predetermined voltage Vc0 when the measured time t has become longer than the predetermined time to.

The relay control section 132 outputs, when the precharge completion determining section 133 determines that precharge of the smoothing capacitors 15c and 16c has been completed normally, an OFF (interruption) signal to the precharge relay 18c, and outputs an ON (conduction) signal to the main relay 18b. When the precharge completion determining section 133 determines that precharge of the smoothing capacitors 15c and 16c has not been completed normally, the relay control section 132 outputs an OFF (interruption) signal to each of the precharge relay 18c and the main relay 18b.

The converter mode setting section 134 outputs, when the precharge completion determining section 133 determines that precharge of the smoothing capacitors 15c and 16c by using the relay circuit 18 has not been completed normally, that is, when the precharge completion determining section 133 determines that it is impossible to perform precharge of the smoothing capacitors 15c and 16c by using the relay circuit 18, a signal for setting the control mode to the precharge mode to the converter controller 20a of the DC-DC converter 20. The converter controller 20a of the DC-DC converter 20 sets the control mode to the precharge mode when having received, as input, the signal for setting the control mode to the precharge mode from the machine controller 13.

The precharge completion determining section 133 executes, similar to the process of determining whether or not precharge of the smoothing capacitors 15c and 16c by using the relay circuit 18 has been completed normally, a process of determining whether or not precharge of the smoothing capacitors 15c and 16c by using the DC-DC converter 20 has been completed normally. Note that since the process content is the same, an explanation thereof is omitted. Note that a threshold for the predetermined time t in this case may be the same value as the threshold t0 described above or may be a different value.

The display control section 135 outputs, when the precharge completion determining section 133 determines that precharge of the smoothing capacitors 15c and 16c by using the DC-DC converter 20 has not been completed normally, that is, when the precharge completion determining section 133 determines that it is impossible to perform precharge of the smoothing capacitors 15c and 16c by using the DC-DC converter 20, a display control signal to a display apparatus 81, and causes a display screen of the display apparatus 81 to display an error display image representing that it is currently impossible to start the engine 2.

The display apparatus 81 is connected to the machine controller 13, and displays, on the display screen, various display images on the basis of display control signals from the machine controller 13. The display apparatus 81 is, for example, a touch panel liquid crystal monitor, and is installed in the cab 8.

Figure 4:
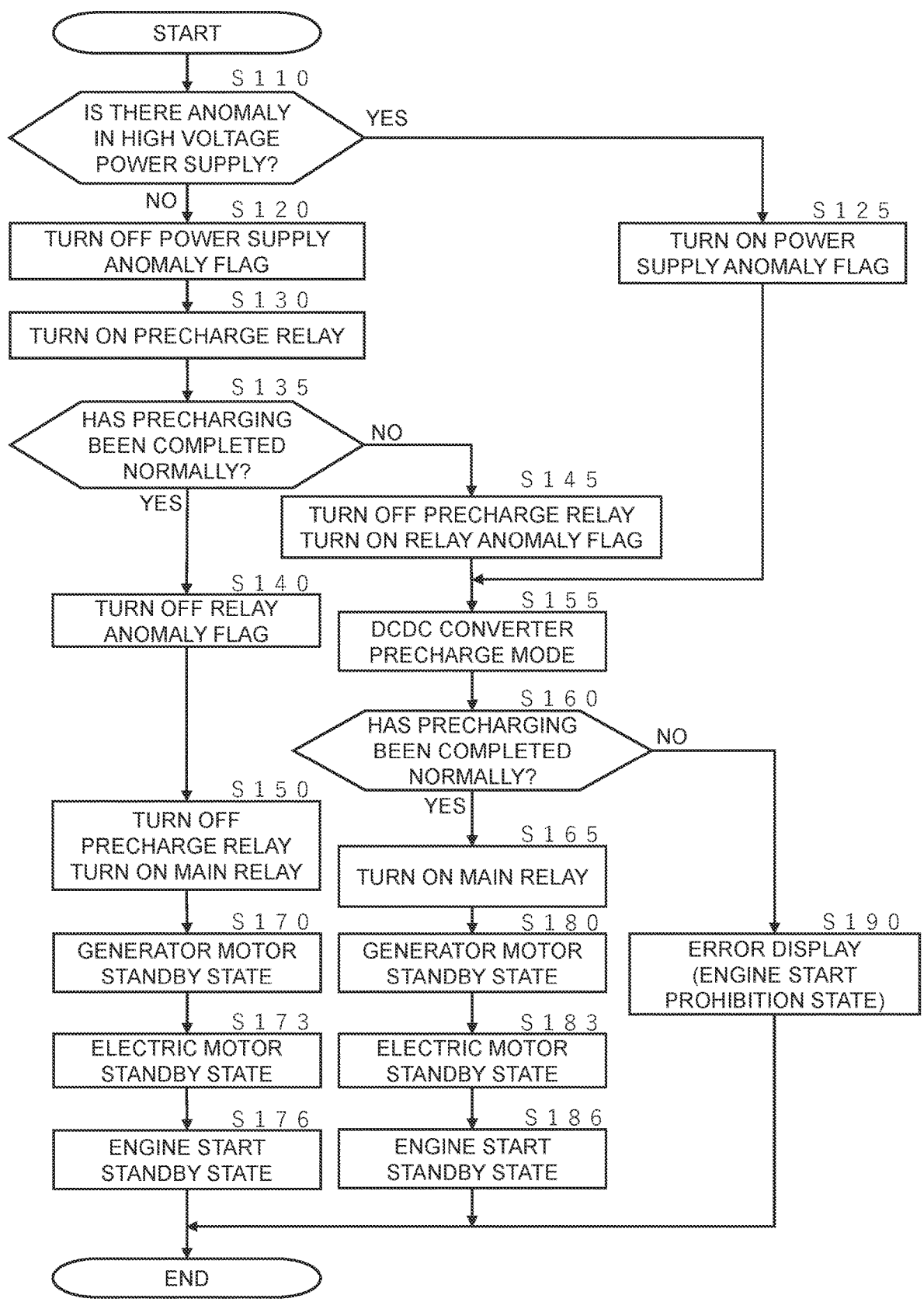
FIG. 4 is a flowchart illustrating the content of a startup process executed by the machine controller according to the present embodiment.

FIG. 4 is a flowchart illustrating the content of a startup process executed by the machine controller 13. The startup process illustrated in FIG. 4 is executed after the ignition switch 22 is switched from the OFF position to the ON position, power of the low voltage power supply 14 is supplied to each controller 13, 2a, 17b, 20a, 15b, and 16b, self diagnosis is performed at each controller 13, 2a, 17b, 20a, 15b, and 16b, and it is determined that each controller 13, 2a, 17b, 20a, 15b, and 16b is normal. Note that when an anomaly (malfunction) is sensed at any of a plurality of the controllers 13, 2a, 17b, 20a, 15b, and 16b, the machine controller 13 causes the display screen of the display apparatus 81 to display a display image representing a controller, which is currently malfunctioning, and informs an operator.

In addition, the machine controller 13 is in the engine start prohibition state until the machine controller 13 enters the engine start standby state (Steps S176 and S186) when a predetermined condition is satisfied in the startup process. The machine controller 13 does not output, when being in the engine start prohibition state, an ON (conduction) signal to the starter relay 28 even if the ignition switch 22 is switched to the start position. That is, when the machine controller 13 is not in the engine start standby state, it is prohibited to start the engine 2. On the other hand, the machine controller 13 outputs an ON (conduction) signal to the starter relay 28, drives the starter motor 21, and starts the engine 2, if the ignition switch 22 is switched to the start position when the machine controller 13 is in the engine start standby state.

As illustrated in FIG. 4, at Step S110, the machine controller 13 determines whether or not there is an anomaly in the high voltage power supply 17. When it is determined at Step S110 that there are no anomalies in the high voltage power supply 17, the process proceeds to Step S120. When it is determined at Step S110 that there is an anomaly in the high voltage power supply 17, that is, when it is determined that precharge of the smoothing capacitors 15c and 16c by using the relay circuit 18 is impossible, the process proceeds to Step S125.

At Step S120, the machine controller 13 turns off the power supply anomaly flag, and the process proceeds to Step S130. At Step S125, the machine controller 13 turns on the power supply anomaly flag, and the process proceeds to Step S155.

At Step S130, the machine controller 13 outputs an ON (conduction) signal to the precharge relay 18c, and the process proceeds to Step S135. Note that the connection of the main relay 18b is kept interrupted. Thereby, the precharge relay 18c becomes conductive, and the smoothing capacitors 15c and 16c are precharged by using power of the high voltage power supply 17.

At Step S135, the machine controller 13 determines whether or not precharge of the smoothing capacitors 15c and 16c by using the precharge relay 18c of the relay circuit 18 has been completed normally. When it is determined at Step S135 that precharge of the smoothing capacitors 15c and 16c has been completed normally, the process proceeds to Step S140. When it is determined at Step S135 that precharge of the smoothing capacitors 15c and 16c has not been completed normally, that is, when it is determined that precharge of the smoothing capacitors 15c and 16c by using the relay circuit 18 is impossible, the process proceeds to Step S145.

At Step S140, the machine controller 13 turns off the relay anomaly flag, and the process proceeds to Step S150. At Step S145, the machine controller 13 outputs an OFF (interruption) signal to the precharge relay 18c, and turns on the relay anomaly flag, and the process proceeds to Step S155.

At Step S150, the machine controller 13 outputs an OFF (interruption) signal to the precharge relay 18c, and outputs an ON (conduction) signal to the main relay 18b, and the process proceeds to Step S170.

At Step S170, the machine controller 13 outputs a standby instruction to the generator motor controller 15b, and the process proceeds to Step S173. The generator motor controller 15b executes, when having received the instruction from the machine controller 13 as input, an initial process and enters the standby state at which the generator motor controller 15b can drive the generator motor 3 by using the first inverter 15.

At Step S173, the machine controller 13 outputs a standby instruction to the motor controller 16b, and the process proceeds to Step S176. The motor controller 16b executes, when having received the instruction from the machine controller 13 as input, an initial process and enters the standby state at which the motor controller 16b can drive the electric motor 12 by using the second inverter 16.

At Step S176, the machine controller 13 exits the engine start prohibition state and enters the engine start standby state, and the startup process illustrated in FIG. 4 is ended.

At Step S155, the machine controller 13 outputs, to the converter controller 20a, a signal for setting the control mode to the precharge mode, and the process proceeds to Step S160. When the control mode of the DC-DC converter 20 is set to the precharge mode, the smoothing capacitors 15c and 16c are precharged by using the DC-DC converter 20.

At Step S160, the machine controller 13 determines whether or not precharge of the smoothing capacitors 15c and 16c by using the DC-DC converter 20 has been completed normally. When it is determined at Step S160 that precharge of the smoothing capacitors 15c and 16c has been completed normally, the process proceeds to Step S165, and when it is determined that precharge of the smoothing capacitors 15c and 16c has not been completed normally, the process proceeds to Step S190.

At Step S165, the machine controller 13 outputs an ON (conduction) signal to the main relay 18b, and the process proceeds to Step S180.

Similar to Step S170, at Step S180, the machine controller 13 outputs a standby instruction to the generator motor controller 15b, and the process proceeds to Step S183. The generator motor controller 15b executes, when having received the instruction from the machine controller 13 as input, an initial process and enters the standby state at which the generator motor controller 15b can drive the generator motor 3 by using the first inverter 15.

Similar to Step S173, at Step S183, the machine controller 13 outputs a standby instruction to the motor controller 16b, and the process proceeds to Step S186. The motor controller 16b executes, when having received the instruction from the machine controller 13 as input, an initial process and enters the standby state at which the motor controller 16b can drive the electric motor 12 by using the second inverter 16.

Similar to Step S176, at Step S186, the machine controller 13 exits the engine start prohibition state and enters the engine start standby state, and the startup process illustrated in FIG. 4 is ended.

At Step S190, the machine controller 13 outputs a display control signal to the display apparatus 81 and causes the display screen of the display apparatus 81 to display an error display image representing that it is currently impossible to start the engine 2, and the startup process illustrated in FIG. 4 is ended. Here, when a cause of an anomaly has been identified, information to that effect may be displayed along with the error display image. For example, when the cause of the anomaly is an overvoltage anomaly of the high voltage power supply 17, information to that effect may be displayed on the display screen of the display apparatus 81. Note that when it is determined at Step S160 that precharge of the smoothing capacitors 15*c* and 16*c* has not been completed normally, the machine controller 13 does not exit the engine start prohibition state, and it is impossible to start the engine 2.

When the machine controller 13 enters the engine start standby state at Steps S176 and S186, it becomes possible to start the engine 2. After the engine 2 is started, the machine controller 13 controls each section of the drive system 100 on the basis of the set state of the power supply anomaly flag. First, with reference to FIG. 2, the content of control to be performed in a case where the power supply anomaly flag has been turned off is explained.

After the engine 2 is started, basically, power generation is performed by the generator motor 3 being driven by the engine 2. Power generated by the generator motor 3 is supplied to the high voltage circuit 70, the electric motor 12 and the electrical driving compressor 29 are driven, and the high voltage power supply 17 is charged. In addition, in a state in which the generator motor 3 is functioning as a generator, the machine controller 13 sets the control mode of the DC-DC converter 20 to the step down mode, causes the DC-DC converter 20 to step down power of the high voltage circuit 70, and causes the power to be supplied to the low voltage circuit 40. The power supplied from the DC-DC converter 20 is supplied to each unit of equipment of the low voltage circuit 40, and also supplied to the low voltage power supply 14 to thereby charge the low voltage power supply 14.

When the generator motor 3 is driven as a motor and assists the engine 2 to drive the main pump 4, power is supplied from the high voltage power supply 17 to the high voltage circuit 70, and the generator motor 3, the electric motor 12, and the electrical driving compressor 29 are driven. In addition, in a state in which the generator motor 3 is functioning as a motor, the machine controller 13 sets the control mode of the DC-DC converter 20 to the step down mode, causes the DC-DC converter 20 to step down power of the high voltage circuit 70, and causes the power to be supplied to the low voltage circuit 40. The power supplied from the DC-DC converter 20 is supplied to each unit of equipment of the low voltage circuit 40, and also supplied to the low voltage power supply 14 to thereby charge the low voltage power supply 14.

The rotation speed of the electric motor 12 is controlled according to the operation amounts of the levers 45*a* of the operation devices 45. Note that in a state in which the power supply anomaly flag has been turned off, the rotation speed of the electric motor 12 can be increased to a maximum rotation speed Nmax. In addition, the electrical driving compressor 29 is controlled such that the actual temperature sensed by a temperature sensor provided in the cab 8 approaches a target temperature set by an operator.

Next, the content of control to be performed where the power supply anomaly flag has been turned on is explained. After the engine 2 is started, basically, power generation is performed by the generator motor 3 being driven by the engine 2. In addition, the machine controller 13 causes, even when an assistance condition which is used to decide to cause the generator motor 3 to assist the engine 2 is satisfied, the generator motor 3 to function as a generator. That is, when the power supply anomaly flag has been turned on, the functionality of the generator motor 3 as a motor is limited, and the generator motor 3 functions only as a generator.

Power generated by the generator motor 3 is supplied to the high voltage circuit 70, and the electric motor 12 and the electrical driving compressor 29 are driven. The machine controller 13 outputs, to the motor controller 16*b*, a command for limiting the output power of the electric motor 12, limits part of the output power of or the entire output power of the electric motor 12, and suppresses output power fluctuations. In the present embodiment, the electric motor 12 is controlled such that the rotation speed of the electric motor 12 becomes a predetermined rotation speed Nc, independently of the operation amounts of the levers 45*a* of the operation devices 45. Note that the predetermined rotation speed Nc is lower than the maximum rotation speed Nmax. In addition, the machine controller 13 outputs, to the electrical driving compressor 29, a command for limiting the output power of the electrical driving compressor 29, limits part of the output power of or the entire output power of the electrical driving compressor 29, and suppresses output power fluctuations.

The machine controller 13 limits, on the basis of the rotation speed or torque of each motor and the voltage or current value of each section that are collected via the machine body communication network 23, the output power of the electric motor 12 and electrical driving compressor 29 such that the power consumption of equipment connected to the high voltage circuit 70 and low voltage circuit 40 does not exceed the power generated by the generator motor 3. Note that the output power limiting of the electric motor 12 and the electrical driving compressor 29 is preferably performed such that the output power of the electric motor 12 is preferentially secured and a surplus is used to drive the electrical driving compressor 29. Thereby, even if there is a situation where power supply from the high voltage power supply 17 cannot be obtained, it becomes possible to activate the hydraulic excavator 1 in a state in which the operation is limited.

In this manner, in the present embodiment, the machine controller 13 limits the output power of the electric motor 12 and electrical driving compressor 29 when precharge of the smoothing capacitors 15*c* and 16*c* by using the DC-DC converter 20 has been able to be completed in a case where the power supply anomaly flag has been turned on, that is, where it is determined that precharge of the smoothing capacitors 15*c* and 16*c* by using the precharge relay 18*c* of the relay circuit 18 is impossible. Thereby, it is possible to reduce the load of the engine 2, and prevent occurrences of engine stalling.

Since the high voltage power supply 17 is normal when the relay anomaly flag has been turned on, limiting control like the one mentioned above of limiting the output power of the electric motor 12 and electrical driving compressor 29 is not executed. That is, the hydraulic excavator 1 can be operated as usual.

The machine controller 13 outputs a display control signal to the display apparatus 81, causes the display screen of the display apparatus 81 to display a display image representing that there is an anomaly in the precharge relay 18*c*, and informs an operator, when the relay anomaly flag has been turned on. Thereby, the operator can perform maintenance of the precharge relay 18*c* and a signal line between the precharge relay 18*c* and the machine controller 13, and solve an anomaly of the precharge relay 18*c*.

Operation to be performed in a case where there is an anomaly in the high voltage power supply 17 can be summarized as follows. When an operator switches the ignition switch 22 to the ON position, it is determined that there is an anomaly in the high voltage power supply 17, and the smoothing capacitors 15c and 16c are precharged by using the DC-DC converter 20 (Y at S110→S125→S155 in FIG. 4). If precharge is completed normally, the machine controller 13 enters the engine start standby state (Y at S160→S165→S180→S183→S186 in FIG. 4). When the engine 2 is started thereafter, the electric motor 12 and the electrical driving compressor 29 are driven in a state in which the output power of the electric motor 12 and electrical driving compressor 29 is limited. That is, the hydraulic excavator 1 can be activated although its operation is limited.

Operation to be performed when there is an anomaly in the precharge relay 18c in a case where there are no anomalies in the high voltage power supply 17 can be summarized as follows. When an operator switches the ignition switch 22 to the ON position, it is determined that there is an anomaly in the precharge relay 18c, and the smoothing capacitors 15c and 16c are precharged by using the DC-DC converter 20 (N at S110→S120→S130→N at S135→S145→S155 in FIG. 4). If precharge is completed normally, the machine controller 13 enters the engine start standby state (Y at S160→S165→S180→S183→S186 in FIG. 4). When the engine 2 is started thereafter, the electric motor 12 and the electrical driving compressor 29 are driven while the output power of the electric motor 12 and electrical driving compressor 29 is not limited. That is, the hydraulic excavator 1 can be activated while its operation is not limited.

According to the embodiment mentioned above, the following effects and advantages can be attained.

The hydraulic excavator (work machine) 1 includes: the machine controller (controller) 13 that controls the hydraulic excavator 1; the low voltage power supply (first power supply) 14 that supplies power to the machine controller 13; the low voltage circuit (first electrical circuit) 40 provided with the low voltage power supply 14; the electric motor (electric drive source) 12 necessary for operating the hydraulic excavator 1; the high voltage power supply (second power supply) 17 that supplies power to the electric motor 12; and the high voltage circuit (second electrical circuit) 70 provided with the high voltage power supply 17.

The hydraulic excavator 1 further includes: the smoothing capacitors (capacitors) 15c and 16c provided to the high voltage circuit 70; the DC-DC converter (first precharge device) 20 that performs precharge of the smoothing capacitors 15c and 16c by using power from the low voltage power supply 14; and the relay circuit (second precharge device) 18 that performs precharge of the smoothing capacitors 15c and 16c by using power from the high voltage power supply 17.

The machine controller 13 is basically set so as to perform precharge of the smoothing capacitors 15c and 16c by using one (the relay circuit 18 in the present embodiment) of the DC-DC converter 20 and the relay circuit 18. The machine controller 13 determines whether or not precharge of the smoothing capacitors 15c and 16c by using the one (the relay circuit 18 in the present embodiment) of the DC-DC converter 20 and the relay circuit 18 is possible. The machine controller 13 performs, when it is determined that precharge of the smoothing capacitors 15c and 16c by using the one (the relay circuit 18 in the present embodiment) of the DC-DC converter 20 and the relay circuit 18 is impossible, precharge of the smoothing capacitors 15c and 16c by using the other one (the DC-DC converter 20 in the present embodiment) of the DC-DC converter 20 and the relay circuit 18.

Thereby, it is possible to avoid a circumstance where the hydraulic excavator 1 cannot be operated when precharge cannot be performed by using the relay circuit 18. Accordingly, according to the present embodiment, it is possible to reduce situations where the hydraulic excavator 1 cannot be operated.

Modification examples like the ones mentioned below are also within the scope of the present invention, and it is also possible to combine the configuration illustrated in a modification example with the configuration explained in the embodiment mentioned above, combine the configurations explained in different modification examples below with each other, and so on.

Modification Example 1

Whereas the example of the DC-DC converter 20 being a bidirectional DC-DC converter is explained in the embodiment described above, the present invention is not limited to this. The DC-DC converter 20 as the first precharge device may be a boost converter that is capable of boosting power supplied from the low voltage power supply 14 to the low voltage circuit 40 and supplying the power to the high voltage circuit 70. In this case, the engine 2 is mechanically connected with an alternator, and the low voltage power supply 14 is charged with (stores) power generated by the alternator. Note that since the DC-DC converter 20 can step down power of the high voltage circuit 70, supply the power to the low voltage circuit 40, and charge the low voltage power supply 14 in the embodiment described above, an alternator can be omitted.

Modification Example 2

Figure 5:
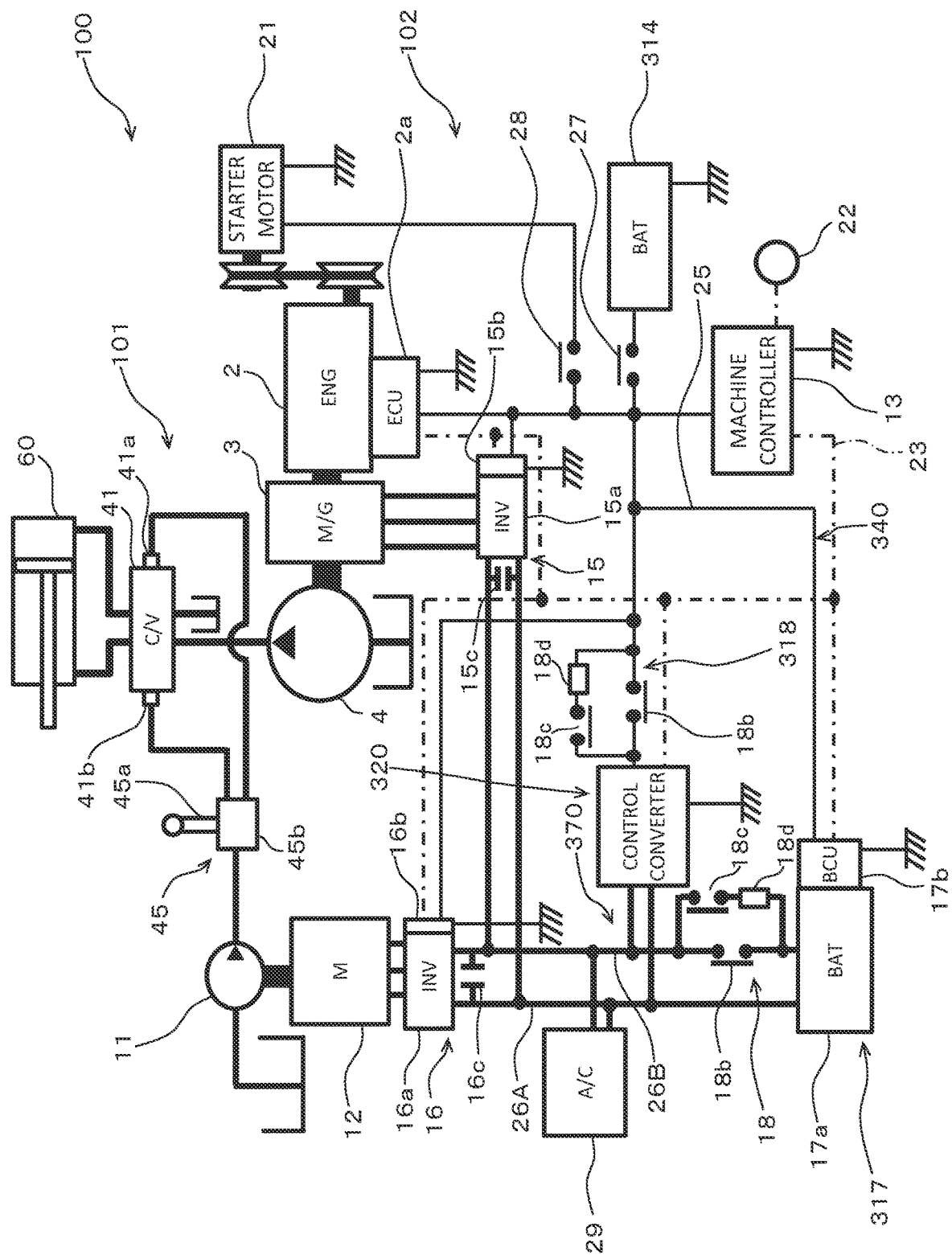
FIG. 5 is a figure illustrating a drive system of the hydraulic excavator according to a modification example 2 of the present embodiment.

Whereas the example of the DC-DC converter 20 being provided between the low voltage circuit 40 provided with the low voltage power supply 14 and the high voltage circuit 70 provided with the high voltage power supply 17 is explained in the embodiment described above, the present invention is not limited to this. For example, as illustrated in FIG. 5, when a first electrical circuit 340 provided with a first power supply 314 and a second electrical circuit 370 provided with a second power supply 317 are at the same potential, relay circuits 18 and 318 as precharge devices may be provided to the first electrical circuit 340 and the second electrical circuit 370, respectively. The relay circuit 318 has, similar to the relay circuit 18 provided to the second electrical circuit 370, the main relay 18b, the precharge relay 18c, and the precharge resistor 18d.

In the present modification example, instead of the DC-DC converter 20 explained in the embodiment described above, a control converter 320 is provided between the first electrical circuit 340 and the second electrical circuit 370. The control converter 320 is provided for suppressing occurrences of fluctuation of voltage in the second electrical circuit 370 at the time of driving of the starter motor 21, and at the time of power generation of an alternator when the alternator is provided.

Modification Example 3

Figure 6:
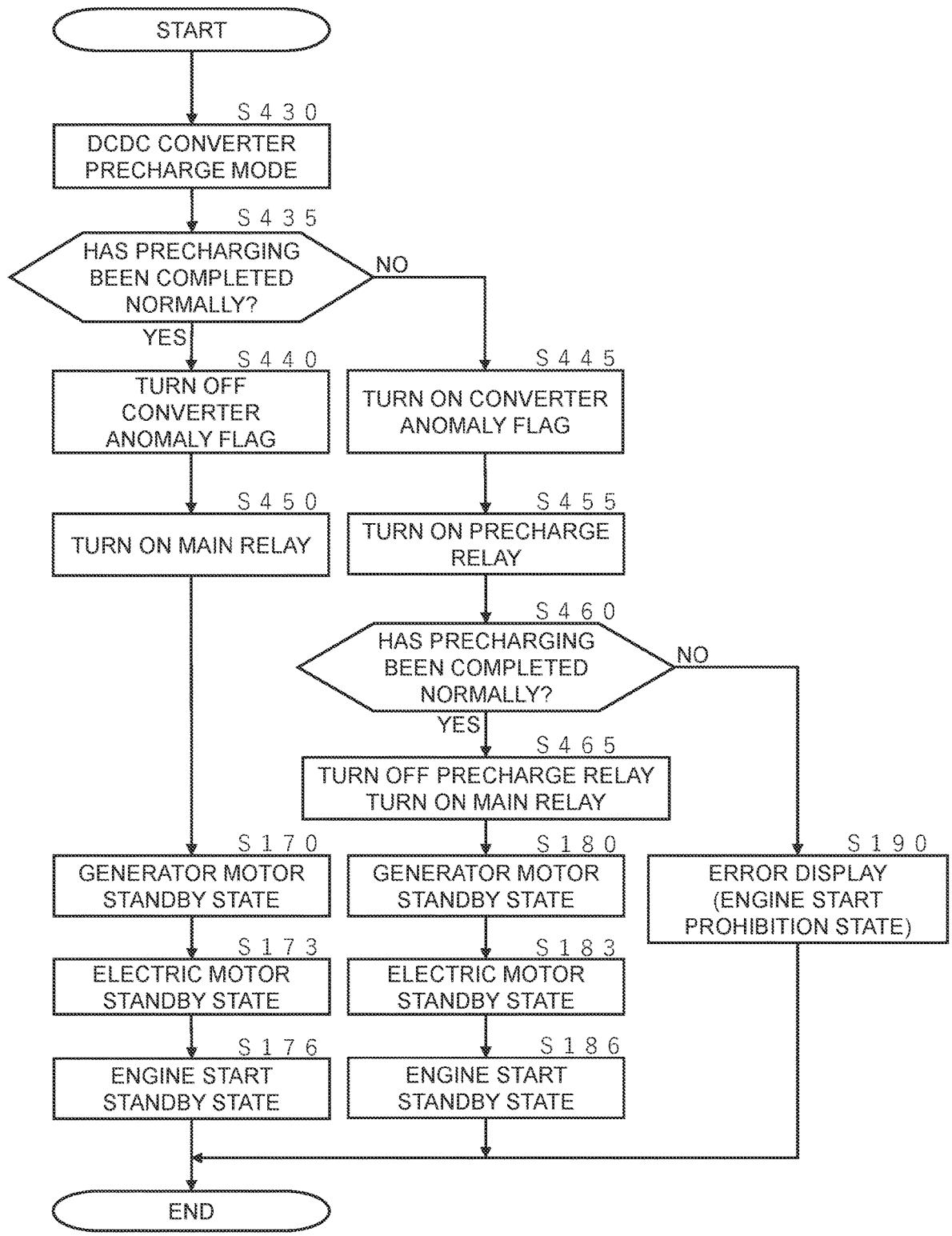
FIG. 6 is a flowchart illustrating the content of the startup process executed by the machine controller according to a modification example 3 of the present embodiment.

Whereas the example of, by the machine controller 13 which is basically set so as to perform precharge of the smoothing capacitors 15c and 16c by using the relay circuit 18, determining whether or not precharge of the smoothing capacitors 15c and 16c by using the relay circuit 18 is possible, and performing precharge of the smoothing capacitors 15c and 16c by using the DC-DC converter 20 when it is determined that precharge is impossible, is explained in the embodiment described above, the present invention is not limited to this. As illustrated in FIG. 6, the machine controller 13 may be basically set so as to perform precharge of the smoothing capacitors 15c and 16c by using the DC-DC converter 20, determine whether or not precharge of the smoothing capacitors 15c and 16c by using the DC-DC converter 20 is possible, and, when it is determined that precharge cannot be performed, perform precharge of the smoothing capacitors 15c and 16c by using the relay circuit 18.

In the flowchart of FIG. 6, the processes at Steps S110, S120, and S125 of FIG. 4 are removed, and the processes at Steps S130, S135, S140, S145, S150, S155, S160, and S165 are replaced with processes at Steps S430, S435, S440, S445, S450, S455, S460, and S465, respectively.

At Step S430, the machine controller 13 executes, as a process similar to Step S155 of FIG. 4, a process of outputting, to the converter controller 20a, a signal for setting the control mode to the precharge mode, and the process proceeds to Step S435.

At Step S435, the machine controller 13 executes, as a process similar to Step S160 of FIG. 4, a process of determining whether or not precharge of the smoothing capacitors 15c and 16c by using the DC-DC converter 20 has been completed normally. When it is determined at Step S435 that precharge of the smoothing capacitors 15c and 16c has been completed normally, the process proceeds to Step S440, and when it is determined that precharge of the smoothing capacitors 15c and 16c has not been completed normally, the process proceeds to Step S445.

At Step S440, the machine controller 13 turns off a converter anomaly flag, and the process proceeds to Step S450. At Step S450, the machine controller 13 outputs an ON (conduction) signal to the main relay 18b, and the process proceeds to Step S170.

At Step S445, the machine controller 13 turns on the converter anomaly flag, and the process proceeds to Step S455. At Step S455, the machine controller 13 executes, as a process similar to Step S130 of FIG. 4, a process of outputting an ON (conduction) signal to the precharge relay 18c, and the process proceeds to Step S460.

At Step S460, the machine controller 13 executes, as a process similar to Step S135 of FIG. 4, a process of determining whether or not precharge of the smoothing capacitors 15c and 16c by using the precharge relay 18c of the relay circuit 18 has been completed normally. When it is determined at Step S460 that precharge of the smoothing capacitors 15c and 16c has been completed normally, the process proceeds to Step S465. When it is determined at Step S460 that precharge of the smoothing capacitors 15c and 16c has not been completed normally, the process proceeds to Step S190.

At Step S465, the machine controller 13 outputs, as a process similar to Step S150 of FIG. 4, an OFF (interruption) signal to the precharge relay 18c, and outputs an ON (conduction) signal to the main relay 18b, and the process proceeds to Step S180.

In the present modification example, when the converter anomaly flag representing an anomaly of the DC-DC converter 20 has been turned on, the machine controller 13 outputs, to the converter controller 20a, a signal for setting the control mode to the stop mode. In addition, the machine controller 13 outputs a display control signal to the display apparatus 81 and causes the display screen of the display apparatus 81 to display a display image representing that the DC-DC converter 20 is anomalous.

Note that whereas the example of the process of determining whether or not the high voltage power supply 17 is anomalous being omitted, is explained in the present modification example, the process of determining whether or not the high voltage power supply 17 is anomalous may be executed between Step S445 and Step S455. In this case, when it is determined that the high voltage power supply 17 is anomalous, the process proceeds to Step S190, and when it is determined that the high voltage power supply 17 is not anomalous, the process proceeds to Step S455.

Modification Example 4

Whereas the example of a valve drive device, which has the electric motor 12 and the pilot pump 11, being adopted as a valve drive device that drives the control valves 41, is explained in the embodiment described above, the present invention is not limited to this. For example, the spool of a control valve 41 and a movable piece of the electric motor may be connected to each other by a link wire, and a direct acting valve drive device by which the spool can be directly operated by driving of the electric motor may be adopted. In this case, the pilot pump 11 is omitted, electric operation levers are adopted instead of the hydraulic pilot type operation devices 45, the electric motor is driven according to the operation amounts of the electric operation levers, and the spool of the control valve 41 is directly driven by the electric motor. Note that the control valves 41 can also be electrical driving valves whose spools are driven by solenoids. In this case, the solenoids serve as an electric drive source.

Modification Example 5

Whereas the example of the electric motor 12, which drives the pilot pump 11, being mentioned as an electric drive source necessary for operating the hydraulic excavator 1 is explained in the embodiment described above, the present invention is not limited to this. For example, an electric motor of a cooling fan for cooling the engine 2 can also be said to be one of electric drive sources necessary for operating the hydraulic excavator 1. This is because if the cooling fan cannot be driven, the engine 2 cannot be cooled, and the engine 2 of the hydraulic excavator 1 cannot be started. In addition, since a temperature increase in the engine 2 cannot be suppressed even when the engine 2 can be started, operation of the hydraulic excavator 1 is limited significantly. Note that, in the present modification example, the pilot pump 11 is driven by the engine 2. Since it is possible to precharge the capacitors provided to the high voltage circuit 70 by using the DC-DC converter 20 even when there is an anomaly of the high voltage power supply 17 or an anomaly of the precharge relay 18c in the present modification example, the cooling fan can be driven. As a result, the hydraulic excavator 1 can be operated. That is, according to the present modification example, similar to the embodiment described above, it is possible to reduce situations where the hydraulic excavator 1 cannot be operated.

Modification Example 6

The hydraulic excavator 1 has an idling stop functionality of stopping the engine 2 when an idling stop condition is satisfied, in some cases. Whereas the example of the output power of the electric motor 12 and electrical driving compressor 29 being limited when the power supply anomaly flag has been turned on is explained in the embodiment described above, the idling stop functionality may be limited in addition to this.

The machine controller 13 according to the present modification example determines whether or not the idling stop condition is satisfied. The idling stop condition is satisfied when the levers 45a of the operation devices 45 of the hydraulic excavator 1 have not been operated for predetermined time tc. In addition, the idling stop condition is not satisfied when the levers 45a of the operation devices 45 of the hydraulic excavator 1 are being operated or when the predetermined time tc has not elapsed even if the levers 45a of the operation devices 45 of the hydraulic excavator 1 are not being operated.

The machine controller 13 determines whether or not the idling stop condition is satisfied on the basis of sensing results of the operation sensors 45s that sense the operation amounts of the operation devices 45, and the threshold tc stored on a storage device of the controller 13. Note that the machine controller 13 determines that the operation devices 45 are not being operated when operation amounts L of the operation devices 45 are smaller than a threshold L0, and determines that the operation devices 45 are being operated when the operation amounts L are equal to or larger than the threshold L0. The threshold L0 is a threshold for determining whether or not the operation devices 45 are being operated and is stored on a storage device of the machine controller 13 in advance.

The machine controller 13 stops the engine 2 when the idling stop condition is satisfied where precharge of the smoothing capacitors 15c and 16c by using the precharge relay 18c of the relay circuit 18 has been able to be completed normally. On the other hand, the machine controller 13 does not stop the engine 2 even if the idling stop condition is satisfied in a case where precharge of the smoothing capacitors 15c and 16c by using the DC-DC converter 20 has been able to be completed and where the high voltage power supply 17 is anomalous and it is determined that precharge of the smoothing capacitors 15c and 16c by using the precharge relay 18c of the relay circuit 18 is impossible. Thus, since it is possible to keep generating generated power by using the generator motor 3 by driving the engine 2, it is possible to avoid a circumstance where it becomes impossible to operate the hydraulic excavator 1 due to a decrease in the battery levels of the power supplies (14 and 17). Accordingly, according to the present modification example, it is possible to reduce situations where the hydraulic excavator 1 having the idling stop functionality cannot be operated when such a hydraulic excavator 1 is used.

Note that the idling stop condition described above is merely an example, and a variety of idling stop conditions can be adopted. For example, an idling stop condition may be satisfied when a gate lock lever provided to the cab 8 of the hydraulic excavator 1 is opened, and an operator is now allowed to get off the cab 8.

Modification Example 7

Whereas the example of the first smoothing capacitor 15c and the second smoothing capacitor 16c being provided is explained in the embodiment described above, the present invention is not limited to this. Either one of the first and second smoothing capacitors 15c and 16c may be omitted.

Modification Example 8

Whereas the example of comparing the state information such as the current value I, voltage value V, or temperature T of the high voltage power supply 17 with the thresholds separately, determining whether or not each state is anomalous, and determining, from results of the determinations, whether or not the high voltage power supply 17 is anomalous is explained in the embodiment described above, the present invention is not limited to this. A variety of methods can be adopted as the method of determining whether or not the high voltage power supply 17 is anomalous.

Modification Example 8-1

For example, it may be determined whether or not the high voltage power supply 17 is anomalous by calculating a determination index for determining an anomaly of the high voltage power supply 17 on the basis of a plurality of pieces of state information in the state information such as the current value I, voltage value V, or temperature T of the high voltage power supply 17, and comparing the determination index with a threshold stored on a storage device.

Modification Example 8-2

It may be determined whether or not the high voltage power supply 17 is anomalous by comparing an index representing variations of the voltage of the high voltage power supply 17 with a threshold stored on a storage device.

Modification Example 8-3

A leakage sensing circuit may be provided in the high voltage power supply 17, and a leakage current may be sensed by the sensing circuit. In this case, the machine controller 13 determines that the high voltage power supply 17 is anomalous when the machine controller 13 has received, as input, a signal representing that a leakage current is sensed.

Modification Example 8-4

The machine controller 13 may determine that the high voltage power supply 17 is anomalous when the machine controller 13 has received, as input, a signal representing that a sensor provided to the battery controller 17b is anomalous.

Modification Example 9

Whereas the example of determining, on the basis of the state information of the high voltage power supply 17 acquired from the battery controller 17b, by the machine controller 13, whether or not the high voltage power supply 17 is anomalous is explained in the embodiment described above, the present invention is not limited to this. The anomaly determination explained in the embodiment described above may be performed by the battery controller 17b. In this case, a signal representing anomaly determination results is output from the battery controller 17b to the machine controller 13. The machine controller 13 determines that the high voltage power supply 17 is anomalous when acquiring determination results representing that the high voltage power supply 17 is anomalous from the battery controller 17b, and determines that the high voltage power supply 17 is not anomalous when acquiring determination results representing that the high voltage power supply 17 is not anomalous (is normal) from the battery controller 17b.

Modification Example 10

Whereas the example of the electrical driving compressor 29 being provided as an auxiliary machine connected to the high voltage circuit 70 is explained in the embodiment described above, auxiliary machines are not limited to this. For example, examples of auxiliary machines connected to the high voltage circuit 70 include a solenoid proportional valve for controlling the hydraulic system, an electric motor of a fan that cools the engine 2, and the like.

Modification Example 11

Whereas the example of determining whether or not the high voltage power supply 17 is anomalous, determining that it is impossible to perform precharge of the smoothing capacitors 15c and 16c by using the relay circuit 18 when the high voltage power supply 17 is anomalous, and performing precharge of the smoothing capacitors 15c and 16c by using the DC-DC converter 20 is explained in the embodiment described above, the present invention is not limited to this. Steps S110, S120, and S125 illustrated in FIG. 4 may be omitted. In this case, when the high voltage power supply 17 is anomalous due to disconnection of internal wires of the high voltage power supply 17 or the like, it is determined at Step S135 that precharge of the smoothing capacitors 15c and 16c has not been completed normally. Accordingly, Step S135 is equivalent to the process of determining whether or not there is an anomaly in the precharge relay 18c and the high voltage power supply 17. Because of this, in the present modification example, at Step S140, the machine controller 13 turns off the relay anomaly flag and the power supply anomaly flag, and the process proceeds to Step S150. In addition, at Step S145, the machine controller 13 outputs an OFF (interruption) signal to the precharge relay 18c and turns on the relay anomaly flag and the power supply anomaly flag, and the process proceeds to Step S155.

Modification Example 12

Whereas the example of determining that precharge of the smoothing capacitors 15c and 16c by using the relay circuit 18 is impossible where precharge of the smoothing capacitors 15c and 16c by using the relay circuit 18 has not been completed when the elapsed time since the start of precharge has become longer than the predetermined time to, and performing precharge of the smoothing capacitors 15c and 16c by using the DC-DC converter 20 is explained in the embodiment described above, the present invention is not limited to this. For example, after the process at Step S145 illustrated in FIG. 4 is completed, the process may proceed to Step S190. In the present modification example, when it is determined at Step S110 that the high voltage power supply 17 is anomalous, the process proceeds to Step S125, and when the process at Step S125 is completed, the process proceeds to Step S155. That is, when the high voltage power supply 17 is anomalous, and it is determined that precharge of the smoothing capacitors 15c and 16c by using the relay circuit 18 is impossible, the smoothing capacitors 15c and 16c are precharged by using the DC-DC converter 20.

Modification Example 13

Whereas the example of the low voltage power supply 14 being a lead storage battery is explained in the embodiment described above, the low voltage power supply 14 is not limited to this, and a variety of power storage devices can be adopted as the low voltage power supply 14. Similarly, whereas the example of the high voltage power supply 17 including the power storage device 17a including electric power storage elements such as lithium ion secondary batteries is explained in the embodiment described above, the high voltage power supply 17 is not limited to this. The high voltage power supply 17 may be one including a power storage device including electric power storage elements such as nickel hydrogen secondary batteries or may be one including an electric double layer capacitor.

Modification Example 14

Whereas the example of determining, on the basis of a signal from each voltage sensor 15s, 16s, and 20s, by the precharge completion determining section 133, whether or not precharge of the smoothing capacitors 15c and 16c has been completed normally is explained in the embodiment described above, the present invention is not limited to this. Since similar sensing results can be obtained about the voltage (bus voltage) of the high voltage circuit 70 at any location, it may be determined whether or not precharge of the smoothing capacitors 15c and 16c has been completed normally on the basis of at least one of signals from the voltage sensors 15s, 16s, and 20s. Note that by executing the determination process on the basis of signals from a plurality of the voltage sensors 15s, 16s, and 20s, the reliability of results of the determination can be enhanced.

Modification Example 15

Whereas the example of the smoothing capacitors 15c and 16c of the inverters 15 and 16 being precharge targets is explained in the embodiment described above, the present invention is not limited to this. For example, when a boost converter is provided to the high voltage circuit 70, a capacitor of the boost converter also becomes a precharge target.

Modification Example 16

Whereas the example of the hydraulic excavator 1, which has an electric drive source, being mentioned as a work machine is explained in the embodiment described above, the present invention is not limited to this. The present invention can be applied to a variety of work machines having an electric drive source such as a wheel loader or crane.

Whereas the embodiment of the present invention has been explained thus far, the embodiment described above is merely illustrated as some of application examples of the present invention, and it is not aimed to limit the technical scope of the present invention to the specific configurations of the embodiment described above.

DESCRIPTION OF REFERENCE CHARACTERS

1: Hydraulic excavator (work machine)
2: Engine
3: Generator motor (generator)
4: Main pump
11: Pilot pump
12: Electric motor (electric drive source)
13: Machine controller (controller)
14: Low voltage power supply (first power supply)
15c, 16c: Smoothing capacitor (capacitor)
16: Inverter
16a: Inverter circuit
17: High voltage power supply (second power supply)
18: Relay circuit (second precharge device)
18b: Main relay 18c: Precharge relay
18d: Precharge resistor
20: DC-DC converter (first precharge device)
40: Low voltage circuit (first electrical circuit)
41: Control valve
45: Operation device
60: Hydraulic actuator
70: High voltage circuit (second electrical circuit)
314: First power supply
317: Second power supply
318: Relay circuit (first precharge device)
340: First electrical circuit
370: Second electrical circuit

The invention claimed is:

1. A work machine comprising:
a controller that controls the work machine;
a low voltage power supply that supplies power to the controller;
a low voltage circuit provided with the low voltage power supply;
an electric drive source necessary for operating the work machine;
a high voltage power supply that supplies power to the electric drive source; and
a high voltage circuit provided with the high voltage power supply, wherein
the work machine further comprises:
a capacitor provided to the high voltage circuit;
a first precharge device provided between the low voltage circuit and the high voltage circuit; and
a second precharge device that is provided to the high voltage circuit and performs precharge of the capacitor by using power from the high voltage power supply, and
the controller is configured to:
perform precharge of the capacitor by using the second precharge device, and
perform precharge of the capacitor by boosting the power from the low voltage power supply using the first precharge device when precharge of the capacitor by using the second precharge device is impossible.

2. The work machine according to claim 1, including:
a main pump;
an actuator that is driven by a working fluid delivered from the main pump;
a control valve that controls a flow of the working fluid introduced from the main pump to the actuator;
a pilot pump driven by the electric drive source;
an operation device that generates a pilot pressure that is an operation signal for operating the control valve by using a delivery pressure of the pilot pump as a source pressure; and
an inverter circuit that drives the electric drive source, wherein
the capacitor is a smoothing capacitor provided on a direct current side of the inverter circuit.

3. The work machine according to claim 1, wherein
the first precharge device is a DC-DC converter provided between the low voltage circuit and the high voltage circuit, and
the second precharge device is a relay circuit provided to the high voltage circuit and has a precharge relay and a precharge resistor connected in parallel with a main relay.

4. The work machine according to claim 1, wherein
the controller is configured to:
determine whether or not the high voltage power supply is anomalous and determine that precharge of the capacitor by using the second precharge device is impossible when the high voltage power supply is anomalous.

5. The work machine according to claim 1, wherein
the controller is configured to:
determine that precharge of the capacitor by using the second precharge device is impossible when precharge of the capacitor by using the second precharge device has not been completed where predetermined time has elapsed since precharge has been started.

6. The work machine according to claim 2, including:
an engine connected to the main pump; and
a generator that is connected to the engine and is capable of supplying power to the high voltage power supply, wherein
the controller is configured to:
limit output power of the electric drive source when it is determined that precharge of the capacitor by using the second precharge device is impossible.

7. The work machine according to claim 2, including:
an engine connected to the main pump; and
a generator that is connected to the engine and is capable of supplying power to the high voltage power supply, wherein
the controller is configured to:
determine whether or not an idling stop condition is satisfied,
stop the engine when the idling stop condition is satisfied in a case where precharge of the capacitor by using the second precharge device has been able to be completed, and
not stop the engine even if the idling stop condition is satisfied in a case where it has been determined that precharge of the capacitor by using the second precharge device is impossible.

* * * * *